United States Patent [19]

Cooney et al.

[11] Patent Number: 5,594,764
[45] Date of Patent: Jan. 14, 1997

[54] AUTOMATED VIDEO CHARACTERIZATION OF NUCLEAR POWER PLANT COMPONENTS

[75] Inventors: Barry F. Cooney, Bethel Park; Thomas M. Camden, Apollo; James P. Duke; David J. Stefko, both of Jeannette, all of Pa.

[73] Assignee: Westinghouse Electric Corporation, Pittsburgh, Pa.

[21] Appl. No.: 467,778

[22] Filed: Jun. 6, 1995

[51] Int. Cl.$^6$ .................................................. G21C 17/00
[52] U.S. Cl. ........................... 376/248; 376/260; 376/259; 376/258; 376/245; 376/434
[58] Field of Search ...................... 376/260, 248, 376/259, 258, 245, 434; 976/DIG. 253; 354/426

[56] References Cited

U.S. PATENT DOCUMENTS

| | | | |
|---|---|---|---|
| 3,165,835 | 1/1965 | Duncan | 376/248 |
| 3,737,372 | 6/1973 | Deberch et al. | 376/248 |
| 4,389,568 | 6/1983 | Dowdy et al. | 250/362 |
| 4,464,332 | 8/1984 | Boisseuil et al. | 376/215 |
| 4,591,996 | 5/1986 | Vachon | 364/508 |
| 4,724,479 | 2/1988 | Schmalfuss et al. | 358/100 |
| 4,759,897 | 7/1988 | Tolino et al. | 376/245 |
| 4,766,374 | 8/1988 | Glass, III et al. | 324/207 |
| 4,842,808 | 6/1989 | Rieben et al. | 376/261 |
| 4,886,348 | 12/1989 | Schmertz | 350/622 |
| 4,946,587 | 8/1990 | Reeves et al. | 209/539 |
| 5,028,379 | 7/1991 | Faulstich | 376/248 |
| 5,056,046 | 10/1991 | Mutchler et al. | 364/551.01 |
| 5,309,486 | 5/1994 | Lichauer et al. | 376/248 |

FOREIGN PATENT DOCUMENTS 0071977  2/1983  European Pat. Off.

OTHER PUBLICATIONS

R.O.V.Technologies Inc., American Nuclear Society, Technology Expo Winter Meeting, Nov. 13, 1994, pp. 1–19.

S. W. Glass et al., *Machine Vision Calibration for A Nuclear Steam Conversion Robot*, Transactions of the American Nuclear Society, Nov. 1994, vol. 71, pp. 512–513.

J. J. Judge, *Core Mapping in PWR Reactor Vessels*, Transactions of the American Nuclear Society, Nov. 1994, vol. 71, pp. 513–514.

Simrad, Fids System Overview, pp. 1–3.

Primary Examiner—Charles T. Jordan
Assistant Examiner—Meena Chelliah
Attorney, Agent, or Firm—D. G. Maire

[57] ABSTRACT

An automated system for determining positions of a plurality of nuclear fuel assemblies organized in an array within a housing of a nuclear power plant includes a radiation hardened, underwater camera for inputting images of the nuclear fuel assemblies with respect to each other or with respect to a baffle wall of a nuclear reactor core, a digital signal processor for generating a second digitized image including a plurality of pixel elements of the nuclear fuel assemblies from the first image, and a workstation for determining the positions of the nuclear fuel assemblies with respect to the baffle wall from counts of the pixel elements.

14 Claims, 6 Drawing Sheets

AUTOMATED VIDEO CHARACTERIZATION OF NUCLEAR POWER PLANT COMPONENTS

BACKGROUND OF THE INVENTION

1. Field of the Invention

This invention relates to a system for characterizing nuclear power plant components and, more particularly, to an automated system for determining dimensions associated with nuclear power plant components such as, for example, gaps between nuclear fuel assemblies.

2. Background of the Information

In a typical nuclear reactor, the reactor core includes a large number of elongated fuel assemblies. Conventional designs of these fuel assemblies include top and bottom nozzles, a plurality of elongated transversely spaced guide thimbles extending longitudinally between and connected at opposite ends to the nozzles, and a plurality of transverse support grids axially spaced along the guide thimbles. Each fuel assembly also includes a multiplicity of elongated fuel elements or rods. The fuel rods are transversely spaced apart from one another and from the guide thimbles. The transverse grids support the fuel rods between the top and bottom nozzles. The fuel rods each contain fissile material in the form of a plurality of generally cylindrical nuclear fuel pellets maintained in a row or stack thereof in the rod. The fuel rods are grouped together in an array which is organized so as to provide a neutron flux in the core sufficient to support a high rate of nuclear fission and, thus, the release of a large amount of energy in the form of heat.

U.S. Pat. No. 4,389,568 discloses a method for monitoring irradiated nuclear fuel using Cerenkov radiation. The Cerenkov light intensity is measured at selected interstices of nuclear fuel assemblies. Images of the fuel assemblies are recorded on video tape for subsequent off-line analysis. Alternatively, on-line digital analysis of the analog video signals is provided.

U.S. Pat. No. 5,309,486 discloses a surface flaw detection system for inspecting discrete manufactured nuclear fuel pellets. A line scan camera records a series of line scans for the pellets and the resulting values of pellet reflectivity are digitized. A threshold comparison of pixel values generates a binary map of "good" and "bad" pixels, the latter being outside of two thresholds. The binary map defines the edges of the pellet in the map. A processor checks for coincidence of the edge pixels with a nominal edge line that best fits the edge of the pellets, and finds surface and edge flaws.

A typical nuclear reactor core contains about 100 to 200 nuclear fuel assemblies which are typically about 13 feet tall with a square cross-section having 8.5 inch sides. The fuel assemblies are vertically positioned in an array within the reactor core and are subject to both twisting and leaning motions away from their intended positions in the array. The top nozzle of each of the fuel assemblies has two locator holes on the top thereof. These locator holes must be properly aligned with corresponding locator pins of a reactor vessel head. The reactor vessel head, which normally rests on top of the reactor core, is typically made of 8 inch sheet steel and weighs about 10 to 15 tons. Therefore, it is critical that the fuel assemblies are suitably inline for correctly engaging the corresponding locator pins of the reactor vessel head before "dropping the head".

It is known to manually use a measuring device, such as a ruler, on a video monitor in order to measure the distance or gap between nuclear fuel assemblies. However, such manual technique is laborious, subject to human error, and subject to cummulative errors as the various gaps are measured between all of the adjacent pairs of the fuel assemblies in the reactor core. Accordingly, there is room for improvement.

SUMMARY OF THE INVENTION

The invention is directed to an automated system for determining positions of a plurality of nuclear power plant components organized in an array within a housing of a nuclear power plant. The automated system includes a camera mechanism for inputting at least one first image, with one of the first images including at least one of the nuclear power plant components and one of at least one reference location of the housing; a digitization mechanism for generating a second image of the at least one nuclear power plant component from the first image, with the second image being a digitized image including a plurality of pixel elements; and a determining mechanism for determining a position of the at least one nuclear power plant component with respect to the reference location from a count of the pixel elements.

The invention is also directed to an automated system for determining positions of a plurality of nuclear fuel assemblies organized in an array within a housing of a nuclear power plant, including a camera mechanism for inputting at least one first image, with one of the first images including at least one of the nuclear fuel assemblies and one of at least one reference location of the housing; a digitization mechanism for generating a second image of the at least one nuclear fuel assembly from the first image, with the second image being a digitized image including a plurality of pixel elements; and a determining mechanism for determining a position of the at least one nuclear fuel assembly with respect to the reference location from a count of the pixel elements.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
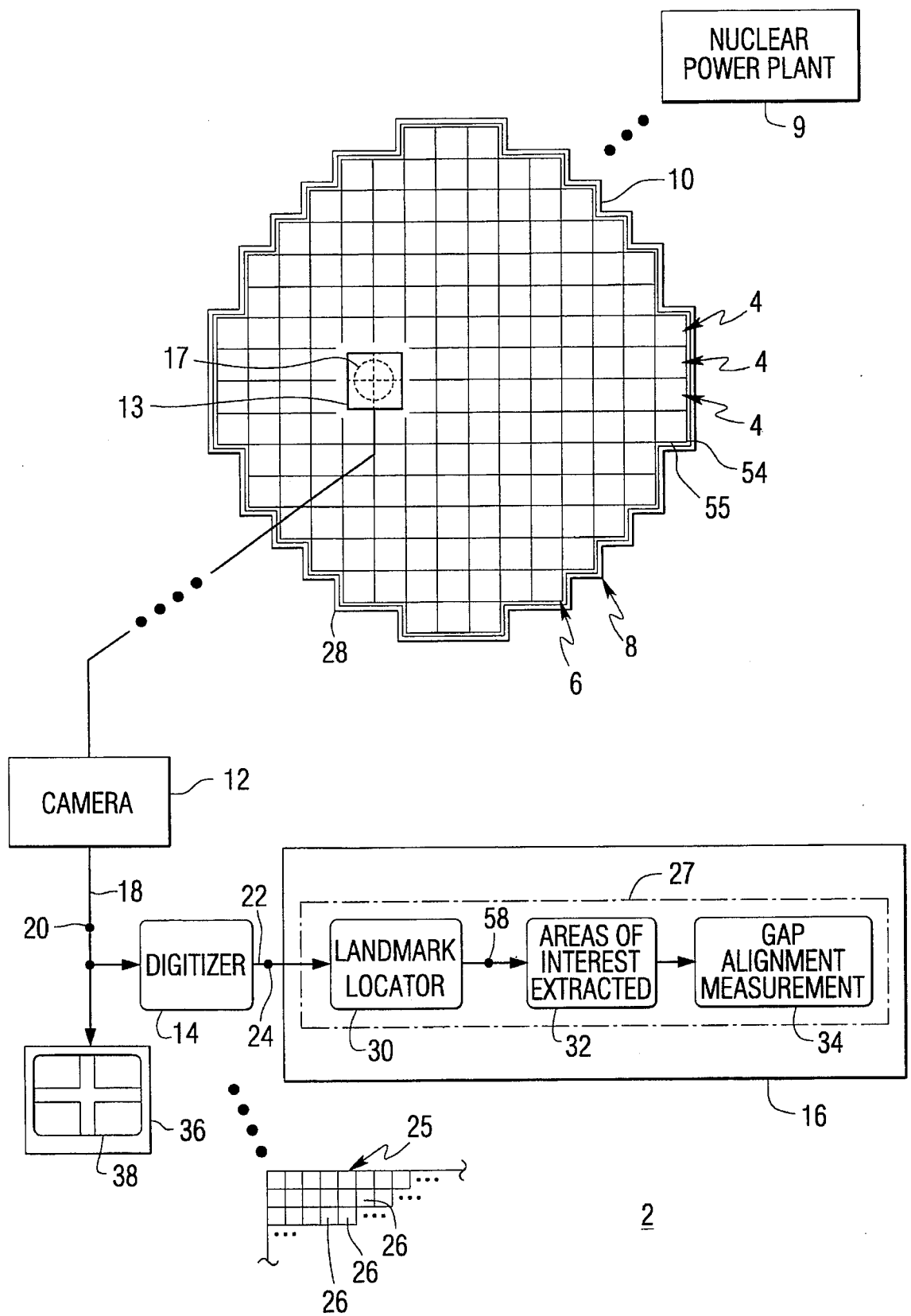
FIG. 1 is a system block diagram in accordance with the present invention.

Referring to FIG. 1, a block diagram of an automated system 2 for determining positions of a plurality of nuclear power plant components, such as the exemplary nuclear fuel assemblies 4, is illustrated.

As employed herein, nuclear power plant components shall expressly include but not be limited to nuclear fuel components, special nuclear material (SNM) such as uranium or plutonium, and nuclear non-fuel components.

As employed herein, nuclear fuel components shall expressly include but not be limited to nuclear fuel assemblies and nuclear fuel rods or pins.

Examples of a nuclear fuel assembly and a nuclear fuel rod are disclosed in U.S. Pat. No. 4,842,808, issued Jun. 27, 1989, which is herein incorporated by reference.

As employed herein, nuclear non-fuel components shall expressly include but not be limited to burnable absorbers (BA), rod cluster control assemblies (RCCA), thimble plugs, neutron sources, spent fuel rack inserts, SNM data detectors, dummy fuel assemblies, pellet cans, failed fuel cans, and boraflex coupon samples.

The nuclear fuel assemblies 4 are organized in an array 6 within a housing such as a nuclear reactor core 8 of a nuclear power plant 9, although the invention is applicable to other types of housings such as, for example, a housing for a spent fuel pool. The nuclear reactor core 8 has a baffle wall 10. The automated system 2 includes a camera mechanism 12 with an X-Y positioning mechanism 13, a digitization mechanism 14 and a workstation 16, although a wide variety of other processors such as, for example, microcomputers, microprocessors, personal computers, minicomputers or mainframe computers may be employed.

The camera mechanism 12 preferably is a radiation hardened, underwater camera such as an ETV-1250 camera system marketed by IST Corporation or an R900 Series camera system with an R976CMC camera marketed by Reese Instruments, Inc., although the invention is applicable to a wide variety of cameras and video systems. The X-Y positioning mechanism 13 moves the camera mechanism 12 with respect to the top of the nuclear fuel assemblies 4 on a refueling machine bridge (not shown) within the nuclear reactor core 8. The camera mechanism 12 inputs one or more images, such as the image 17 (shown in hidden line drawing) of some of the nuclear fuel assemblies 4. In turn, the camera mechanism 12 outputs a video signal or camera image signal 18 on line 20.

The digitization mechanism 14 preferably is a digitizer such as a MultiVideo 700 card marketed by Parallax Graphics for installation in the workstation 16; or a digital signal processor, separate from the workstation 16, such as a MAX 200 with AS Module video processing board, up to 3 MAXBolt array processors, and a VME Box enclosure with VME bus marketed by Datacube, although the invention is applicable to a wide variety of digitization mechanisms for producing a digital image from a camera image or video signal. The digitization mechanism 14 generates a digital image signal 22 of some of the nuclear fuel assemblies 4 on line 24 from the camera image signal 18. The digital image signal 22 includes a pixel array 25 having a plurality of pixel elements 26.

The exemplary workstation 16 includes software 27 which determines positions of the nuclear fuel assemblies 4 with respect to a reference location, such as the exemplary reference location 28 of the baffle wall 10 from the pixel elements 26. The software 27 includes a landmark locator module 30, an area extraction module 32 and a gap alignment measurement module 34 which are discussed in greater detail below with FIGS. 2–5. The system 2 may include a video monitor or display 36 which displays a visual image 38 from the camera image signal 18.

Figure 2:
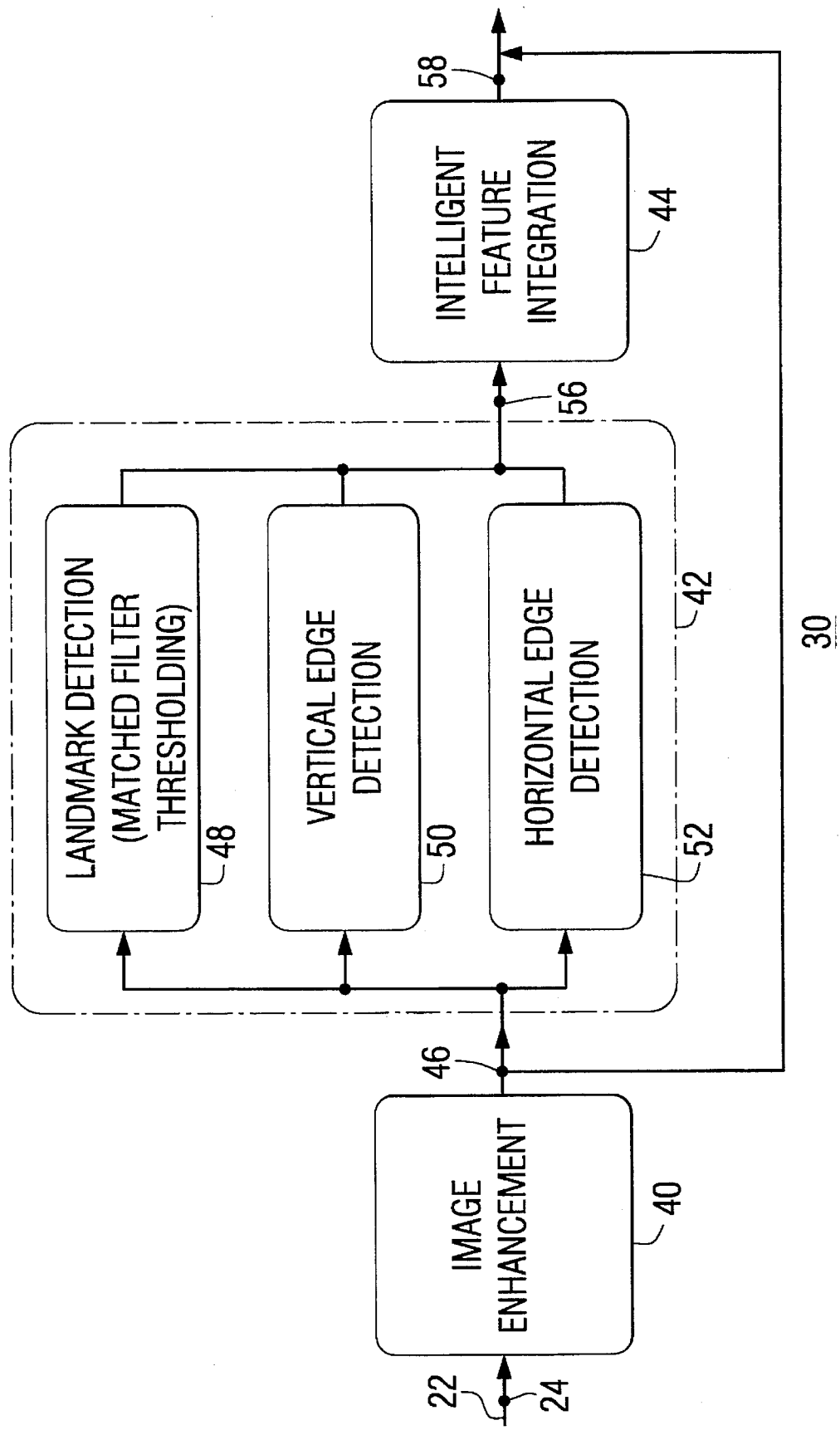
FIG. 2 is a block diagram of the landmark locator software module of FIG. 1.

Also referring to FIG. 2, the landmark locator module 30 includes an image enhancement module 40, a feature extraction module 42 and an intelligent feature integration module 44. The image enhancement module 40 refines the digital image signal 22 from the digitization mechanism 14 and supplies a refined image signal 46 to the feature extraction module 42 and the area extraction module 32. The feature extraction module 42 includes a landmark detection module 48, a vertical edge detection module 50 and a horizontal edge detection module 52 which are employed to determine whether a feature, such as a corner 54 or one of the edges 55 of one of the fuel assemblies 4, exists and to provide a probability distribution associated therewith using an output signal 56. In turn, the intelligent feature integration module 44 uses the output signal 56, determines the position of one or more of such features in the pixel array 25, locates a landmark on one of the fuel assemblies 4, such as the exemplary corner 54, and identifies the position of such landmark in the pixel element array 25 using the output 58.

Figure 3:
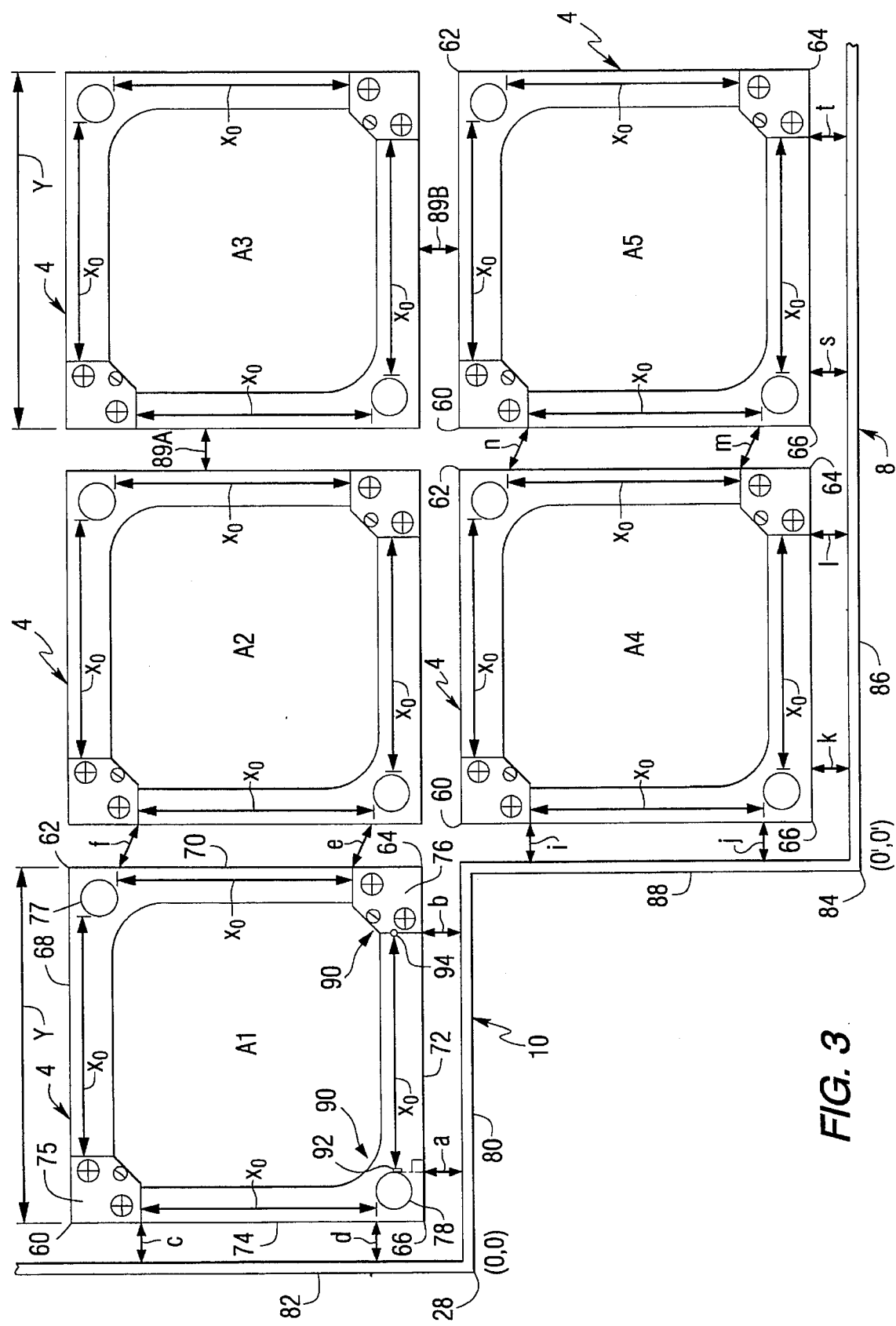
FIG. 3 is a plan view of a portion of the reactor core including a baffle wall and various nuclear fuel assemblies.

Referring to FIG. 3, a plan view of a portion of the reactor core 8 of FIG. 1 is illustrated. The exemplary reference location 28 of the baffle wall 10 is designated as an origin (0,0) for the position of the fuel assemblies 4 which are individually identified as A1,A2,A3,A4,A5, although the invention is applicable to any known reference location and any number of fuel assembly locations or positions. Each of the fuel assemblies A1–A5 has four corners 60,62,64,66; four edges 68,70,72,74; two spring clamps 75,76; and two locator holes 77,78 as shown with the fuel assembly A1. The reference location 28 includes an X-axis 80 and a Y-axis 82 defined by the baffle wall 10, although the invention is applicable to other reference locations and axes, such as location 84 and axes 86,88. The intended position of the fuel assemblies A1–A5 is where, for example, the edges 72,74 of the fuel assembly A1 are parallel with respect to the axes 80,82, respectively, and where the gap dimensions, such as the gap dimensions 89A,89B, between the fuel assemblies A1–A5 are within a predetermined distance range.

As shown with the edge 72 of the fuel assembly A1, each of the edges 68,70,72,74 of the fuel assemblies A1–A5 have locator mechanism 90 associated therewith. The exemplary locator mechanism 90 includes a pair of landmarks 92,94 associated with the edge 72 of the fuel assembly A1. The exemplary landmark 92 is an edge of the locator hole 78 which is normal with respect to the edge 72 of the fuel assembly A1. The exemplary landmark 94 is an edge of the spring clamp 76 which is normal with respect to the edge 72 of the fuel assembly A1, although the invention is applicable to a wide variety of locator mechanisms and landmarks such as, for example, the corners 60,62,64,66 or any known or added feature of the fuel assemblies A1–A5.

Figure 4:
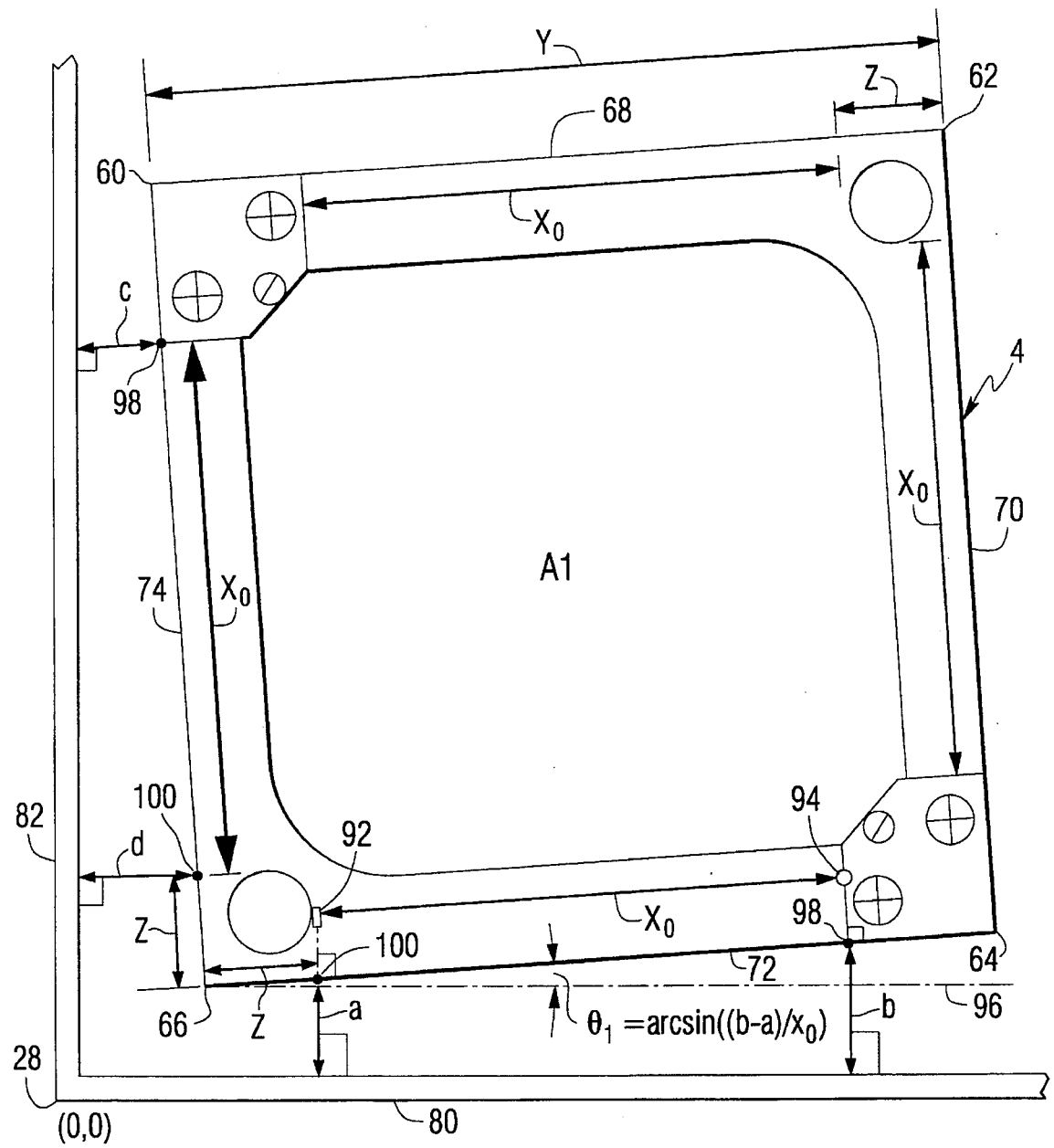
FIG. 4 is a more detailed plan view of a portion of the baffle wall and one of the nuclear fuel assemblies of FIG. 3.

Also referring to FIG. 4, the exemplary fuel assembly A1 has a square cross section and the edges 68–74 have a known dimension (Y), although the invention is applicable to fuel assemblies having a known generally rectangular cross section. The fuel assembly A1 also has a known dimension $(x_o)$ between the measurement landmarks 92,94 and a known dimension (Z) from the measurement landmark 92 to the corresponding corner 66. The exemplary fuel assembly A1 has an angle of inclination $\Theta_1$ (which is exaggerated for convenience of illustration) with respect to an ideal position illustrated by the horizontal line 96 and, also, with respect to the horizontal or X-axis 80. The location of the corners 60,62,64,66 of the fuel assembly A1 with respect to the known reference (0,0) location 28 is determinable using, for example, the known dimensions $x_o$, Y and Z, as well as three of four gap measurements a,b,c,d. The exemplary gaps a and b are defined as the perpendicular distance between the X-axis 80 and respective points 100 and 98 on the edge 72 as defined by the exemplary landmarks 92 and 94, respectively. The exemplary gaps c and d are similarly defined with respect to the Y-axis 82.

For example, the x location (1X3) of the corner 64 of the fuel assembly A1 is determined from Equations 1, 2 or 3:

$$1X3 = d + Z \sin \Theta_1 + Y \cos \Theta_1 \qquad \text{(Eq. 1)}$$

$$1X3 = d + Z \sin \Theta_1 + Y \cos (\sin^{-1} (\sin \Theta_1)) \qquad \text{(Eq. 2)}$$

$$1X3 = d + Z \left( \frac{b-a}{x_0} \right) + Y \cos \left( \sin^{-1} \left( \frac{b-a}{x_0} \right) \right) \qquad \text{(Eq. 3)}$$

The y location (1Y3) of the corner 64 of the fuel assembly A1 is determined from Equations 4 or 5:

$$1Y3 = b + (Y - x_0 - Z) \sin \theta_1 \qquad \text{(Eq. 4)}$$

$$1Y3 = b + (Y - x_0 - Z) \left( \frac{b-a}{x_0} \right) \qquad \text{(Eq. 5)}$$

The x and y locations (1X4 and 1Y4, respectively) of the corner 66 of the fuel assembly A1 are similarly determined from Equations 6 and 7, respectively:

$$1X4 = d + Z \left( \frac{b-a}{x_0} \right) \qquad \text{(Eq. 6)}$$

$$1Y4 = a - Z \left( \frac{b-a}{x_0} \right) \qquad \text{(Eq. 7)}$$

The angle of inclination ($\Theta_1$) of the fuel assembly A1 is determined from Equation 8:

$$\theta_1 = \sin^{-1}(\sin(\theta_1)) = \sin^{-1} \left( \frac{b-a}{x_0} \right) \qquad \text{(Eq. 8)}$$

After one of the corners 60,62,64,66 and the angle of inclination $\Theta_1$ are known, the locations of the other corners 60,62,64,66 are readily determined. For example, the y position (1Y1) and x position (1X1) of the corner 60 of the fuel assembly A1 are determined from Equations 9 and 10, respectively:

$$1Y1 = 1Y4 + Y \cos \Theta_1 \qquad \text{(Eq. 9)}$$

$$1X1 = 1X4 - Y \sin \Theta_1 \qquad \text{(Eq. 10)}$$

Still referring to FIG. 3, after the corners 60–66 of the fuel assembly A1 have been located, the x and y locations of the corners 60–66 of the fuel assembly A4 with respect to the known reference (0',0') location 84 (and, hence, the known reference location 28) are determined in a similar manner as the corners 60–66 of the fuel assembly A1, where the angle of inclination ($\Theta_4$) from the horizontal for the fuel assembly A4 is determined from Equation 11:

$$\theta_4 = \sin^{-1}(\sin(\theta_4)) = \sin^{-1} \left( \frac{l-k}{x_0} \right) \qquad \text{(Eq. 11)}$$

where:

k,l,i,j: are measured gaps for the fuel assembly A4 which respectively correspond to the measured gaps a,b,c,d of the fuel assembly A1

Similarly, the angle of inclination ($\Theta_5$) from the horizontal for the fuel assembly A5 is determined from Equation 12:

$$\theta_5 = \sin^{-1}(\sin(\theta_5)) = \sin^{-1} \left( \frac{t-s}{x_0} \right) \qquad \text{(Eq. 12)}$$

where:

s,t: are measured gaps for the fuel assembly A5 which respectively correspond to the measured gaps k,l of the fuel assembly A4

In turn, as explained in greater detail below with FIG. 5 for the fuel assembly A2, the angles of inclination $\Theta_4,\Theta_5$ and the measured gaps n,m between the fuel assemblies A4,A5 may be used to determine the position of the corners 60–66 of the fuel assembly A5.

Figure 5:
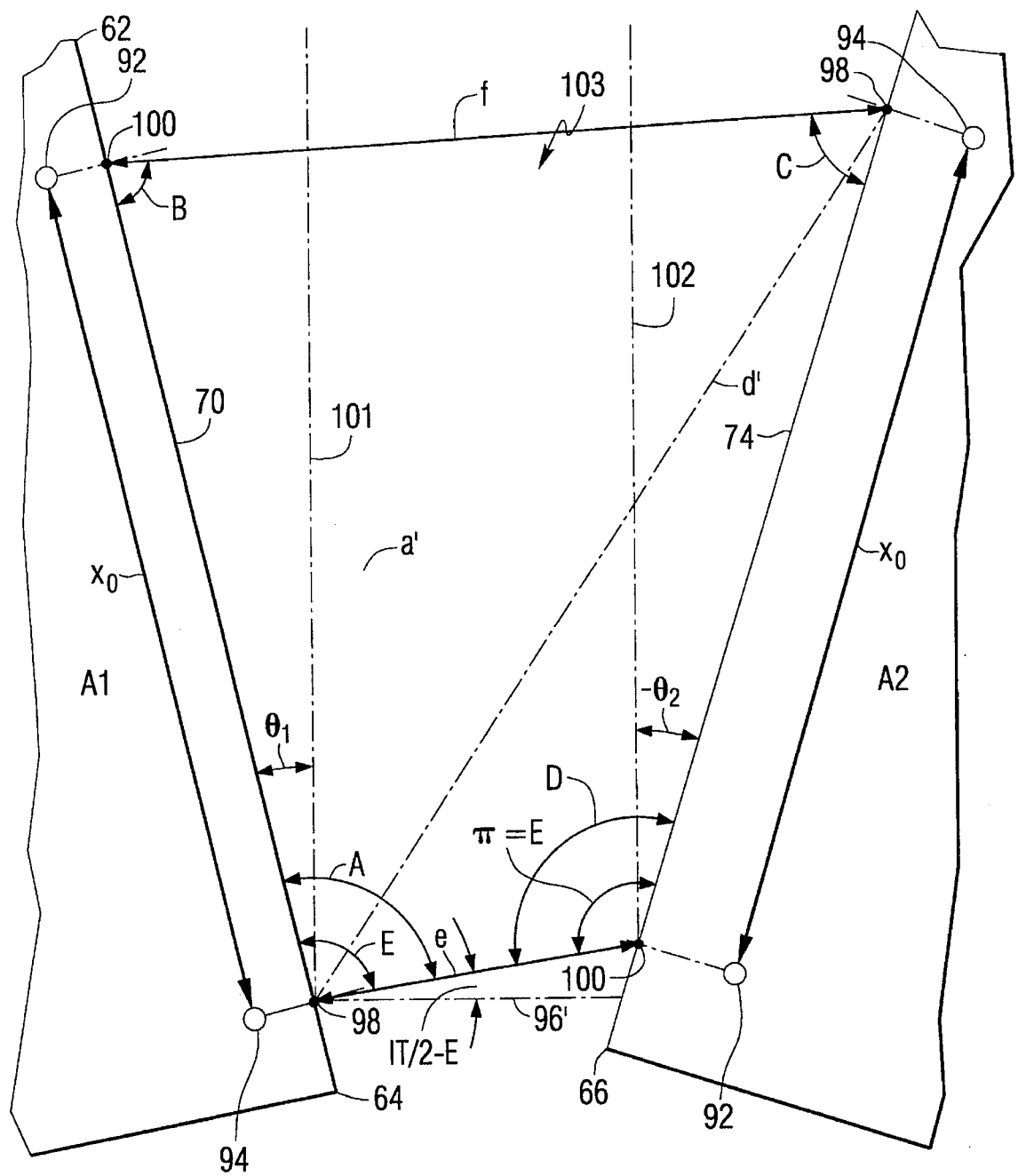
FIG. 5 is another more detailed plan view of portions of two of the nuclear fuel assemblies of FIG. 3.

Referring to FIGS. 3 and 5, the location of a fuel assembly, such as the fuel assembly A2, which is not adjacent a horizontal or vertical surface of the baffle wall 10, such as the horizontal axes 80,86 or the vertical axes 82,88, may be determined, for example, from measured gaps e,f; and measured angles A,D. As shown in FIG. 5, the fuel assemblies A1,A2 have respective angles of inclination $\Theta_1,-\Theta_2$ (which are exaggerated for convenience of illustration) with respect to the horizontal line 96' and the vertical lines 101,102, where a negative angle of inclination occurs whenever the corner 64 (shown in FIGS. 3 and 4) is lower than the corner 66 with respect to the horizontal line 96'. The measured gap e is measured between the point 98 (associated with the landmark 94 of the side 70 of the fuel assembly A1) and the point 100 (associated with the landmark 92 of the side 74 of the fuel assembly A2). The measured gap f is measured between the point 100 (associated with the landmark 92 of the side 70 of the fuel assembly A1) and the point 98 (associated with the landmark 94 of the side 74 of the fuel assembly A2). The side 70 of the fuel assembly A1, the measured gap f, the side 74 of the fuel assembly A2, and the measured gap e define a quadrilateral 103 with angles A,B,C,D at the four corners thereof. Equations 13–16 provide a description of the quadrilateral 103 associated with the pair of fuel assemblies A1,A2.

$$A = \Theta_1 + E \qquad \text{(Eq. 13)}$$

$$D = -(\Theta_2) + (\pi - E) \qquad \text{(Eq. 14)}$$

$$E = A - \Theta_1 \qquad \text{(Eq. 15)}$$

$$\Theta_2 = -D + (\pi - E) = -D + \pi - A + \Theta_1 \qquad \text{(Eq. 16)}$$

The angles A,D and the other angles B,C are determinable from the digital image signal 22 of FIG. 1 based on the spatial relationship between the points 98–100, 100–98 between which the gaps e,f are respectively measured. For example, Equations 17A or 17B are used to determine the angle A:

$$A = \cos^{-1} ((e^2 + x_0^2 - ((f_{y1} - e_{y2})^2 + (f_{x1} - e_{x2})^2))/2ex_0) \qquad \text{(Eq. 17A)}$$

$$A = \cos^{-1} ((e^2 + x_0^2 - a'^2)/2ex_0) \qquad \text{(Eq. 17B)}$$

where:

a': is the distance from the point 100 of the fuel assembly A1 associated with the landmark 92 at corner 62 thereof to the point 100 of the fuel assembly A2 associated with the landmark 92 at corner 66 thereof $f_{x1},f_{y1}$: are the respective x and y locations of the point 100 of the fuel assembly A1 associated with the landmark 92 at corner 62 thereof $e_{x2},e_{y2}$: are the respective x and y locations of the point 100 of the fuel assembly A2 associated with the landmark 92 at corner 66 thereof The x location (2X4) of the corner 66 of the fuel assembly A2 is determined from Equations 18, 19 and 20:

$$1X3_L = 1X3 - (Y - x_0 - Z) \sin \theta_1 \qquad \text{(Eq. 18)}$$

$$2X4_O = e (\cos (\pi/2 - E)) + Z \sin \theta_2 \qquad \text{(Eq. 19)}$$

$$2X4 = 1X3_L + 2X4_O \qquad \text{(Eq. 20)}$$

where:

$1X3_L$: is the x position of the point 98 of the fuel assembly A1 associated with the landmark 94 at corner 64 thereof $2X4_O$: is the x position offset of the corner 66 of the fuel assembly A2 from the x position of the point 98 of the fuel assembly A1 associated with the landmark 94 at corner 64 thereof $2X4$: is the x position of the corner 66 of the fuel assembly A2

The y location (2Y4) of the corner 66 of the fuel assembly A2 is determined from Equations 21, 22 and 23:

$$1Y3_L = 1Y3 + (Y - x_0 - Z)\cos\theta_1 \quad \text{(Eq. 21)}$$

$$2Y4_O = e(\sin(\pi/2 - E)) - Z\cos\theta_2 \quad \text{(Eq. 22)}$$

$$2Y4 = 1Y3_L + 2Y4_O \quad \text{(Eq. 23)}$$

where:

$1Y3_L$: is the y position of the point 98 of the fuel assembly A1 associated with the landmark 94 at corner 64 thereof $2Y4_O$: is the y position offset of the corner 66 of the fuel assembly A2 from the y position of the point 98 of the fuel assembly A1 associated with the landmark 94 at corner 64 thereof $2Y4$: is the y position of the corner 66 of the fuel assembly A2

The locations of the other corners 60,62,64 (shown in FIG. 3) of the fuel assembly A2 are readily determined with the angle of inclination ($\Theta_2$) as similarly discussed above for the angle of inclination ($\Theta_1$) with Equations 9 and 10.

Figure 6:
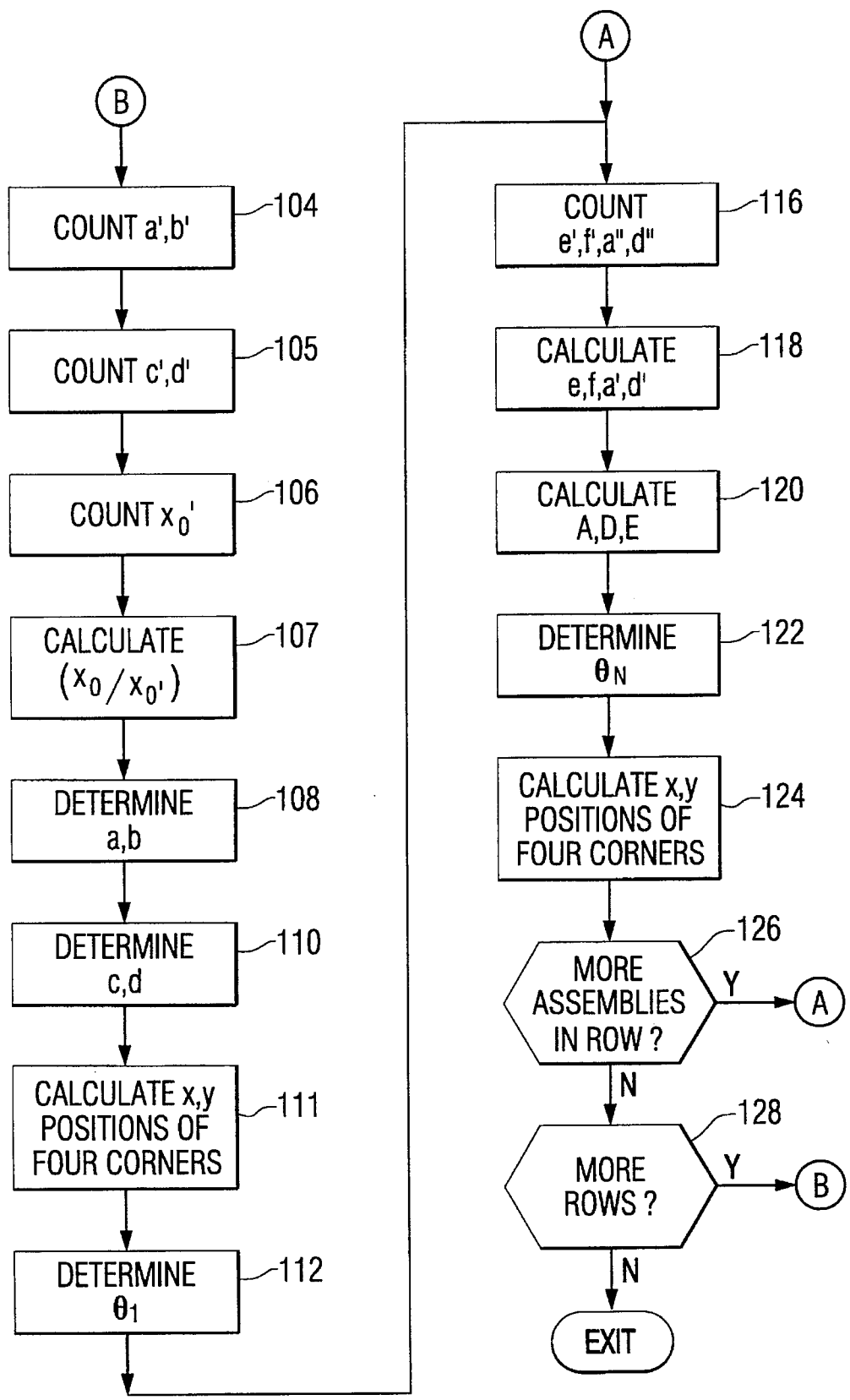
FIG. 6 is a software flowchart in accordance with the invention.

FIG. 6 is a flowchart of software executed by the area extraction module 32 and gap alignment measurement module 34 of FIG. 1. Also referring to FIG. 4, at step 104, the module 32 counts a first pair of counts a',b' of the pixels 26, which correspond to the respective measured gaps a,b, from the horizontal X-axis 80 to the points 100,98 at the edge 72 of the fuel assembly A1. Then, at step 105, the module 32 counts a second pair of counts c',d' of the pixels 26, which correspond to the respective measured gaps c,d, from the vertical Y-axis 82 to the points 98,100 at the edge 74 of the fuel assembly A1. At step 106, the module 32 counts a count $x_0'$ of the pixels 26, which correspond to one of the distances between one of the pairs of landmarks 92,94 of the fuel assembly A1.

Next, at steps 107, 108 and 110, the distances associated with the measured gaps a,b,c,d are calculated by the gap alignment measurement module 34 using Equation 24:

$$\text{DISTANCE} = \text{PIXELS}\left(\frac{x_0}{x_0'}\right) \quad \text{(Eq. 24)}$$

where:

DISTANCE: is the distance of one of the measured gaps (e.g., a,b,c,d)

PIXELS: is the count of pixels which corresponds to DISTANCE

The step 107 facilitates calibration of the system 2 of FIG. 1. The calibration factor ($x_0/x_0'$) uses a known distance, such as $x_0$, divided by the corresponding pixel count for such distance, and provides a distance between adjacent pairs of the pixel elements 26, although any known distance and corresponding pixel count may be used as part of this calibration. Steps 108 and 110 determine the respective distances of the measured gaps a,b and c,d.

At step 111, the distance between the reference location 28 and each of the corners 60,62,64,66 of the fuel assembly A1 are calculated in the manner discussed above in connection with Equations 1–7 for the corners 64,66. Then, at step 112, the angle of inclination $\Theta_1$ of the fuel assembly A1 is determined using Equation 8.

At step 116, the module 32 counts four counts e',f',a",d" of the pixels 26, which correspond to the respective measured gaps e,f,a',d' between the fuel assemblies A1,A2 as shown with FIG. 5. Then, at step 118, the distances associated with the measured gaps e,f,a',d' are calculated by the gap alignment measurement module 34 using Equation 24. This determines the distance between each of the points 98,100 on the edge 70 of the fuel assembly A1 and the corresponding points 100,98, respectively, on the edge 74 of the fuel assembly A2. At step 120, the angles A,D,E are calculated as similarly discussed above in connection with FIG. 5 and Equations 15, 17A–17B and, at step 122, the angle of inclination $\Theta_N$ of the fuel assembly 4 (e.g., $\Theta_2$ of the fuel assembly A2) is determined using Equation 16, with the angle of inclination $\Theta_1$ of the adjacent fuel assembly A1 being known from step 112. Then, at step 124 the distance between the reference location 28 and each of the corners 60,62,64,66 of the fuel assembly A2 are calculated in the manner discussed above in connection with Equations 18–20 and 21–23 for the corner 66 of the fuel assembly A2.

At step 126, a check is made whether there are any additional fuel assemblies 4 (e.g., A3) in the current row of FIG. 3. If yes, then steps 116–126 are repeated. On the other hand, if there are no additional fuel assemblies 4 in the current row, then at step 128, a check is made whether there are any additional rows of the fuel assemblies 4 (e.g., A4 and A5). If yes, then execution resumes at step 104. Otherwise, the routine exits. The steps 126,128 utilize the known format of the array 6 of the fuel assemblies 4 of FIG. 1.

The system 2 disclosed herein significantly reduces the time required to obtain the information necessary to manually determine the positions of the fuel assemblies 4 in the array 6 of FIG. 1 (e.g., about 5 hours for about 200 fuel assemblies 4). Moreover, the accuracy of the system 2, which is primarily limited by the resolution of the refined image signal 46 of FIG. 2 which is derived from the pixel array 25 of FIG. 1, significantly improves the quality of the position information obtained therefrom.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An automated system for determining positions of a plurality of nuclear power plant components organized in an array within a housing of a nuclear power plant, the housing having at least one reference location, said system comprising:

camera means for inputting at least one first image, with one of the first images including at least one of said nuclear power plant components and the reference location;

digitization means for generating a second image of said at least one of said nuclear power plant components from the first image, with the second image being a digitized image including a plurality of pixel elements; and determining means for determining a position of said at least one of said nuclear power plant components with respect to the reference location from a count of the pixel elements.

2. The system as recited in claim 1 wherein each of said nuclear power plant components have plural edges; and wherein said determining means includes:

means for locating some of the edges of said at least one of said nuclear power plant components; and counting means for counting a count of the pixel elements between the reference location and said some of the edges of said at least one of said nuclear power plant components.

3. The system as recited in claim 2 wherein each of the edges of said nuclear power plant components have locator means associated therewith; wherein said means for locating some of the edges includes means for locating said locator means; and wherein said counting means includes means for counting a count of the pixel elements between the reference location and said locator means of some of the edges of said at least one of said nuclear power plant components.

4. The system as recited in claim 3 wherein the reference location includes two axes; wherein each of said nuclear power plant components includes two edges which are generally parallel with respect to the two axes; wherein each of said locator means includes a pair of landmarks associated with one of the edges of a corresponding one of said nuclear power plant components; wherein said counting means includes first counting means for counting a first pair of counts of the pixel elements from a first axis of the reference location to the pair of landmarks associated with a first edge of said one of said nuclear power plant components, and second counting means for counting a second pair of counts of the pixel elements from a second axis of the reference location to the pair of landmarks associated with a second edge of said one of said nuclear power plant components; and wherein said determining means includes means for determining an orientation of said one of said nuclear power plant components from the first and second pairs of counts.

5. The system as recited in claim 4 wherein each of the pairs of landmarks have a predetermined distance therebetween; and wherein said counting means includes third counting means for counting a count of the pixel elements between one of the pairs of landmarks; and wherein said determining means includes means for calibrating a distance between adjacent pairs of the pixel elements from the predetermined distance and said count of the pixel elements between one of the pairs of landmarks.

6. The system as recited in claim 5 wherein said determining means includes first calculating means for calculating the distance between the first axis of the reference location and each of the landmarks on the first edge of said one of said nuclear power plant components, and second calculating means for calculating the distance between the second axis of the reference location and each of the landmarks on the second edge of said one of said nuclear power plant components.

7. The system as recited in claim 6 wherein said nuclear power plant components include a nuclear fuel assembly having four sides each of which has a predetermined dimension, with adjacent sides defining a corner of the nuclear fuel assembly; and wherein said determining means includes third calculating means for calculating the distance between the reference location and each of the corners of the nuclear fuel assembly.

8. The system as recited in claim 6 wherein said nuclear power plant components include a plurality of nuclear fuel assemblies each of which has four sides, with each of the sides having a predetermined dimension and with adjacent sides defining a corner of the nuclear fuel assembly; and wherein said determining means includes third calculating means for calculating the distance between the reference location and each of the corners of the nuclear fuel assemblies.

9. The system as recited in claim 8 wherein the nuclear fuel assemblies include a first nuclear fuel assembly and a second nuclear fuel assembly; wherein said determining means includes fourth calculating means for calculating an angle of inclination of each of the nuclear fuel assemblies with respect to one of the axes of the reference location, fifth calculating means for calculating the distance between each of the landmarks on one of the edges of the first nuclear fuel assembly and the corresponding landmarks on one of the edges of the second nuclear fuel assembly, and sixth calculating means for calculating the distance between the reference location and each of the corners of the second nuclear fuel assembly.

10. An automated system for determining positions of a plurality of nuclear fuel assemblies organized in an array within a reactor, the reactor having at least one reference location, said system comprising:

camera means for inputting at least one first image, with one of the first images including at least one of said nuclear fuel assemblies and the reference location;

digitization means for generating a second image of said at least one of said nuclear fuel assemblies from the first image, the second image being a digitized image including a plurality of pixel elements; and determining means for determining a position of said at least one of said nuclear fuel assemblies with respect to the reference location from a count of the pixel elements.

11. The system as recited in claim 10 wherein each of said nuclear fuel assemblies have plural edges; and wherein said determining means includes:

means for locating some of the edges of said at least one of said nuclear fuel assemblies; and counting means for counting a count of the pixel elements between the reference location and said some of the edges of said at least one of said nuclear fuel assemblies.

12. The system as recited in claim 11 wherein each of the edges of said nuclear fuel assemblies have locator means associated therewith; wherein said means for locating some of the edges includes means for locating said locator means; and wherein said counting means includes means for counting a count of the pixel elements between the reference location and said locator means of some of the edges of said at least one of said nuclear fuel assemblies.

13. A method for measuring the position of a plurality of fuel assemblies within a reactor core, the method comprising the steps of:

moving a camera with respect to the top of said fuel assemblies to produce a video signal representing said fuel assemblies and a reference location;

digitizing said video signal, said digitized video signal comprising a plurality of pixels;

determining the position of at least one of said fuel assemblies by counting the pixels between said one of said fuel assemblies and said reference location.

14. The method of claim 13, wherein said reference location comprises a second of said fuel assemblies, and further comprising the step of determining the dimension of a gap between said first and said second of said fuel assemblies by counting the pixels between said first and said second of said fuel assemblies.

* * * * *